United States Patent [19]

Degnan et al.

[11] Patent Number: 5,185,310
[45] Date of Patent: Feb. 9, 1993

[54] ACTIVATING SILICOALUMINOPHOSPHATE COMPOSITIONS

[75] Inventors: Thomas F. Degnan, Morrestown, N.J.; Sharon B. McCullen, Newtown, Pa.; Kirk D. Schmitt, Pennington; George H. Hatzikos, Mantua, both of N.J.

[73] Assignee: Mobil Oil Corp., Fairfax, Va.

[21] Appl. No.: 829,149

[22] Filed: Jan. 31, 1992

[51] Int. Cl.$^5$ .................. B01J 29/02; B01J 27/18
[52] U.S. Cl. ..................................... 502/214
[58] Field of Search ................... 502/214, 85

[56] References Cited

U.S. PATENT DOCUMENTS

| 4,440,871 | 4/1984 | Lok et al. | 502/214 |
| 4,559,314 | 12/1985 | Shihabi | 502/71 |
| 4,563,435 | 1/1986 | Chu et al. | 502/85 |
| 4,666,875 | 5/1987 | Pellet et al. | 502/214 |
| 4,673,559 | 6/1987 | Derouane et al. | 423/306 |
| 4,780,444 | 10/1988 | Derouane et al. | 502/214 |
| 4,914,067 | 4/1990 | Pellet et al. | 502/214 |

OTHER PUBLICATIONS

E. M. Flanigen, R. L. Patton et al., Studies in Surface Science and Catalysts, 1988, 37, 13.
E. M. Flanigen et al., New Developments in Zeolite Science and Technology, Elsevier, New York, N.Y., 1986, 103.
J. A. Martens et al., J. of Catalysis, 1990, 126, 299.
A. F. Ojo et al., J. Chem. Soc. Faraday Trans., 1992, 88, 105.

Primary Examiner—Carl F. Dees
Attorney, Agent, or Firm—Alexander J. McKillop; Dennis P. Santini; Laurence P. Hobbes

[57] ABSTRACT

A method of activating silicoaluminophosphate (SAPO) compositions by contacting as-synthesized SAPO with hydrated alumina and water, followed by heating to at least 425° C., preferably in nitrogen and then air.

19 Claims, 1 Drawing Sheet

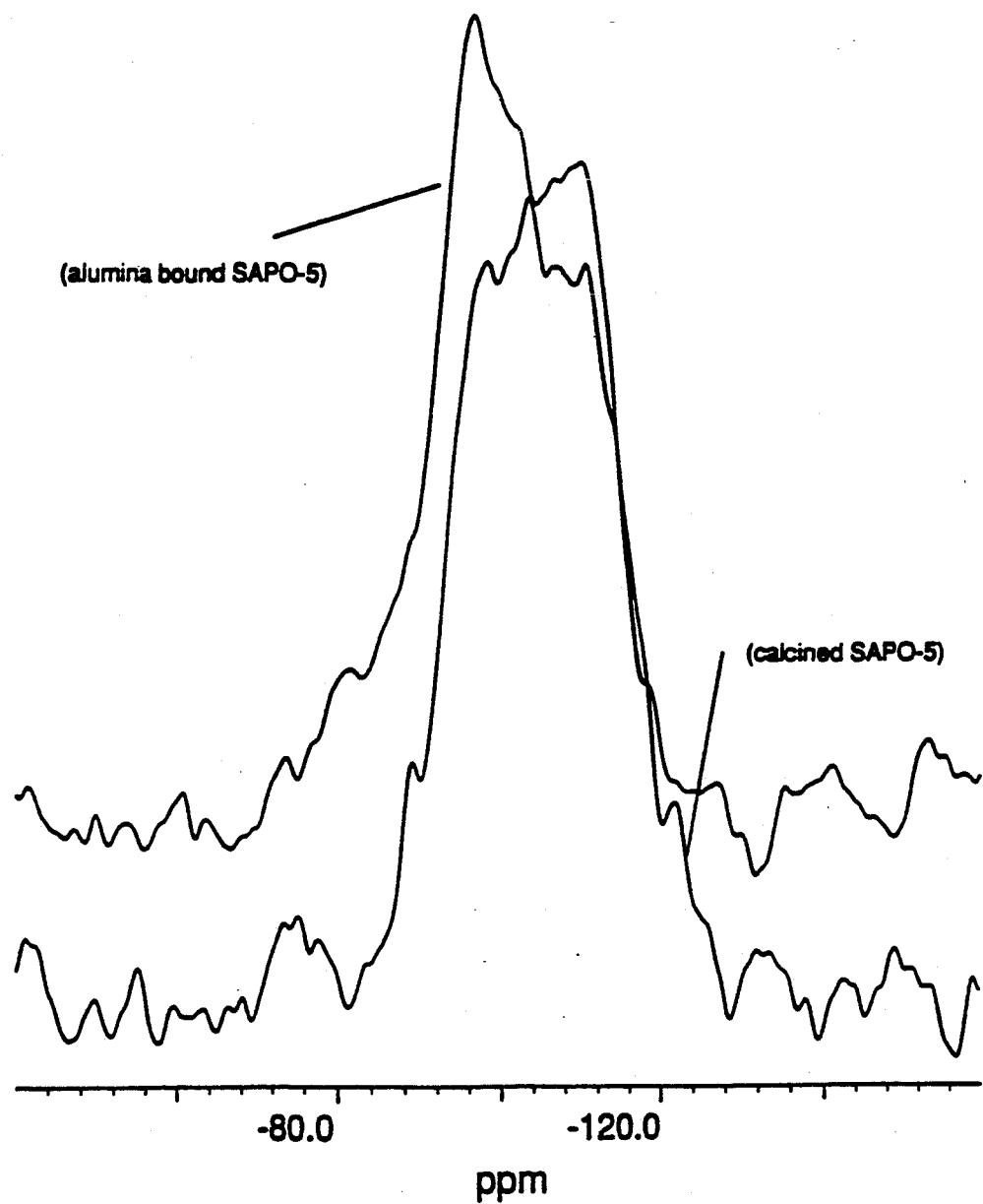

ACTIVATING SILICOALUMINOPHOSPHATE COMPOSITIONS

FIELD OF THE INVENTION

This invention relates to a method for activating silicoaluminophosphate (SAPO) compositions by treatment with hydrated alumina.

BACKGROUND OF THE INVENTION

U.S. Pat. No. 4,559,314, the contents of which are incorporated herein by reference, discloses a method for activating zeolites by compositing with an alumina binder containing water and thereafter contacting with steam.

U.S. Pat. No. 4,780,444, the contents of which are incorporated herein by reference, discloses a method for activating metallophosphates such as aluminophosphates (AlPOs) with an activating metal oxide, such as silica, and water under conditions, such as mulling, sufficient to increase the acid catalytic activity of the material.

Crystalline, microporous silicoaluminophosphates (SAPOs) are described in the Lok et al U.S. Pat. No. 4,440,871, the entire disclosure of which is expressly incorporated herein by reference. Partial substitution of aluminum for phosphorus in silicoaluminophosphate frameworks in order to generate catalytically active acid sites has been a long-standing goal of this area of molecular sieve science. For the most part, significant catalytic activity has not been achieved. This may result from the bulk silicon content being present as coprecipitated silica, or, as silicon-rich islands within the framework affording few active Si-O-Al interactions. The present invention provides a method for enhancing acid activity by increasing the number of acid sites, i.e., tetrahedral aluminum in the SAPO framework.

SUMMARY OF THE INVENTION

The present invention provides a method of activating silicoaluminophosphate compositions. In one aspect, the present invention relates to a method of producing an improved catalyst, by contacting a crystalline silicoaluminophosphate molecular sieve with gel alumina and water, and thereafter heating the resulting mixture to at least 425° C., preferably in the presence of an inert gas and then in the presence of an oxidizing gas, to enhance the acid activity of the catalyst. In another aspect, the present invention relates to a method for enhancing catalytic cracking activity of a crystalline silicoaluminophosphate molecular sieve which comprises compositing the silicoaluminophosphate with water and 10 to 90 weight percent of alumina based on the resulting composite, and exposing the resulting composite to elevated temperatures of at least 450° C., preferably in the presence of nitrogen and then air, in order to substantially increase the catalytic activity of said mixture. In still another aspect, the present invention relates to a crystalline silicoaluminophosphate catalyst composite consisting essentially of a mixture of a crystalline silicoaluminophosphate and about 10 to 90 weight percent of alumina, said composite being treated by exposure to elevated temperatures of at least 450° C., preferably in the presence of nitrogen and then air, in order to substantially increase the catalytic activity of said mixture.

BRIEF DESCRIPTION OF THE DRAWINGS

The Figure shows Si-NMR of treated and untreated samples of SAPO-5 (Examples 2 and 3) containing peaks for $Si(OAl)_4$ and $Si(OSi)_4$ showing an increase in the size of the $Si(OAl)_4$ peak relative to the $Si(OSi)_4$ peak.

DESCRIPTION AND PREFERRED EMBODIMENTS

Silicoaluminophosphates are generally prepared from a forming mixture containing sources of oxides of silicon, aluminum and phosphorus. The forming mixture may be an aqueous and/or organic medium. The mixture may also contain an organic directing agent as known in the silicoaluminophosphate synthesis art, e.g., tetraalkylammonium ion. Examples of such directing agents include tetramethylammonium hydroxide (TMAOH), tetraethylammonium hydroxide (TEAOH), and tetrapropylammonium hydroxide (TPAOH).

Sources of aluminum oxide in the SAPO forming mixture include, as non-limiting examples, any known form of aluminum oxide or hydroxide, organic or inorganic salt or compound. Sources of silicon oxide besides those specified as required by the present invention include, as non-limiting examples, any known form of silicic acid or silicon dioxide, alkoxy- or other compounds of silicon. Sources of phosphorus oxide include, as non-limiting examples, any known form of phosphorus acids or phosphorus oxides, phosphates and phosphites, and organic derivatives of phosphorus. Further details relating to formation of the forming mixtures for silicoaluminophosphate compositions, including molar amounts of each oxide source can be found in the aforementioned U.S. Pat. No. 4,440,871.

Crystallization conditions for the forming mixture generally include maintaining the mixture at temperatures of at least 100° C. for a time sufficient to effect crystallization. Further details regarding crystallization conditions can be found in U.S. Pat. No. 4,440,871.

Crystalline silicoaluminophosphates which can be activated by the present invention include SAPO-4, SAPO-5, SAPO-11 SAPO-16, SAPO-17, SAPO-20, SAPO-31, SAPO-34, SAPO-35, SAPO-37, SAPO-40, SAPO-41, SAPO-42, and SAPO-44. These materials and their method of preparation are disclosed in U.S. Pat. No. 4,440,871. MCM-2, MCM-3, MCM-4, MCM-5, MCM-6, MCM-7, MCM-8, MCM-9, and MCM-10 are examples of other SAPOs suited to treatment by the present invention. These materials and their method of preparation are disclosed in U.S. Pat. No. 4,673,559, the contents of which is incorporated herein by reference.

When the SAPOs are prepared in the presence of organic cations they are initially catalytically inactive, possibly because the intracrystalline free space is occupied by organic cations from the forming solution. They may be activated by heating in an inert atmosphere at 538° C. for one hour, for example, followed by base exchange with ammonium salts followed by calcination, preferably at temperatures below 538° C. in order to avoid stability problems.

The SAPO, preferably in the as-synthesized form, is treated in accordance with the invention by compositing with a hydrated alumina. The alumina will normally act as a binder for the silicoaluminophosphate. Alternatively, the silicoaluminophosphate can be in the hydrogen-exchanged form when composited with the hydrated alumina.

Suitable sources of hydrated alumina include crystallized aluminum trihydroxide forms that meet the formula Al(OH)$_3$, e.g., Gibbsite, Bayerite, and Nordstrandite. Aluminum oxyhydroxide forms of the formula AlO(OH).xH$_2$O are also suited to use in the present activation method. Examples of such materials include boehmite (an isotype of iron lipidocrocite), pseudoboehmite (also known as microcrystalline boehmite), boehmite, and diaspore, an isotype of iron goethite. Among these materials, pseudoboehmite is particularly preferred.

It is contemplated that other binder materials may be used to further supplement the required hydrated alumina. Other matrix or binder materials suitable for incorporation in the SAPO compositions include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Catalyst compositions containing the present composition will generally comprise from about 1% to 90% by weight of the silicoaluminophosphate composition and from about 10% to 99% by weight of the matrix material. More preferably, such catalyst compositions will comprise from about 2% to 80% by weight of the present composition and from about 20% to 98% by weight of the matrix. Preferably, the catalyst composition comprises hydrated alumina as the sole matrix material.

The SAPO can be composited with the hydrated alumina by intimately mixing the two materials together, in the presence of water, after which the mixture is formed into suitable particles and dried. It has been found that the desired enhancement of activity does not occur if the SAPO and hydrated alumina are simply mixed dry together instead of being intimately wet mixed as described above. The finely ground mixture of SAPO, binder and water may conveniently be formed into particles by extrusion using an extrusion press or, alternatively, other shaping methods may be used such as pelletizing or pressing. The amount of water is chosen to give a mixture which has a satisfactory consistency for the forming step. The SAPO may contain sufficient occluded water or sufficient water may be present in the binder.

Use of an additional matrix or binder material in conjunction with the SAPO/hydrated alumina composition, i.e. combined therewith, which is active, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the density and crush strength of the overall catalyst.

Naturally occurring clays which can be optionally composited with the crystalline silicoaluminophosphate include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the SAPO/alumina hydrate composition can be composited with an additional porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. The relative proportions of finely divided crystalline material and inorganic oxide gel matrix vary widely, with the crystal content ranging from 1 to 90 percent by weight and more usually, particularly when the composite is prepared in the form of beads, in the range of 2 to 80 weight percent of the composite.

The SAPO composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) (25 mm) screen and be retained on a 400 mesh (Tyler) (0.037 mm) screen. In cases where the catalyst is molded, such as by extrusion, the crystals can be extruded before drying or partially dried and then extruded. In a particularly preferred embodiment, the composite mixture is formed by mulling the silicoaluminophosphate and the alumina together in the presence of water and forming catalyst particles by extruding the mulled wet mixture.

The resulting extrudate can then be dried at a temperature ranging from 50° to 150° C., preferably 90° to 120° C., for a period of time sufficient to substantially remove water from the composite, for example, 0.05 to 2 hours, preferably 0.1 to 1 hours.

After the SAPO/binder composite has been formed, it is heated to at least 425° C., say at least 450° C., preferably in an inert gas and then in the presence of an oxidizing gas, to enhance the acid activity of the catalyst. The inert gas can be nitrogen, or helium, with nitrogen preferred. The oxidizing gas can be oxygen or an oxygen-containing mixture such as air. The heating is carried out by increasing the temperature at a rate of 0.5° to 100° C./minute, preferably 1° to 30° C./minute until the desired temperature is reached. The composite is maintained in the presence of inert gas for a period of 0.5 to 10 hours, preferably 1 to 5 hours. The composite is subsequently exposed to the oxidizing gas for a period sufficient to remove catalyst carbon content to less than 1 wt %, say, 0.5 to 10 hours.

The catalyst composition after activation by the present method exhibits significantly increased acid activity over untreated silicoaluminophosphate. Increases of over 50 or even 100 percent in the hexane cracking activity (Alpha Value) may be obtained.

The activated catalyst of the present invention is particularly suited to use in acid catalyzed processes such as fluid catalytic cracking, hydrocracking, isomerization, and oligomerization.

Employing a catalytically active form of the present activated composition as a catalyst component, said catalyst possibly containing additional hydrogenation components, reforming stocks can be reformed employing a temperature of from 370° C. to 540° C., a pressure of from 100 psig to 1000 psig (791 to 6996 kPa), preferably from 200 psig to 700 psig (1480 to 4928 kPa), a liquid hourly space velocity is from 0.1 to 10, preferably from 0.5 to 4, and a hydrogen to hydrocarbon mole ratio of from 1 to 20, preferably from 4 to 12.

A catalyst comprising the present composition may be used for hydroisomerization of normal paraffins, when provided with a hydrogenation component, e.g. platinum. Such hydroisomerization is carried out at a temperature of from 90° C. to 375° C., preferably from 145° C. to 290° C., with a liquid hourly space velocity of from 0.01 to 2, preferably from 0.25 to 0.50, and with a hydrogen to hydrocarbon mole ratio of from 1:1 to 5:1. Additionally, such a catalyst can be used for olefin or aromatic isomerization, employing a temperature of from 200° C. to 480° C.

Such a catalyst can also be used for reducing the pour point of gas oils. This reaction is carried out at a liquid hourly space velocity of from 10 to 30 and at a temperature of from 425° C. to 595° C.

Other reactions which can be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in *The Journal of Catalysis*, 6, pp. 522–529 (August 1965), and in *The Journal of Catalysis*, 61, p. 395 (1980), each incorporated herein by reference as to that description. The experimental conditions of the test used herein include a constant temperature of 538° C. and a variable flow rate as described in detail in *The Journal of Catalysis*, 61, p. 395 (1980).

EXAMPLE 1

SAPO-5 was synthesized according to Example 9 of U.S. Pat. No. 4,440,871. 128 g of Catapal ™ Al$_2$O$_3$ were added to 214 g of 85% H$_3$PO$_4$ diluted with 134 g of deionized water and then stirred well. 25 g of fumed silica were mixed with 950 g 40% tetrapropylammonium hydroxide. The aluminophosphate gel was then added to the TPAOH-silica gel and stirred until a homogeneous solution was obtained. The sample was crystallized in a 2 liter Teflon ™ -lined autoclave for 36 hours at 227° C. and 100 rpm stirring. The product slurry was diluted with 2 liters of deionized water, allowed to settle, and then decanted. This wash/decant cycle was repeated until a clear supernatant was obtained. The sample was then filtered and dried at 130° C. Properties of the as-synthesized material are given in the Table below.

TABLE

| Elemental Analysis | Properties of SAPO-5 |
|---|---|
| Si, wt % | 10.6 |
| Al, wt % | 47.8 |
| P, wt % | 41.7 |
| Ion Exchange Capacity | 0.82 meq/g |

EXAMPLE 2

The SAPO-5 molecular sieve described in Example 1 was pelleted and calcined in flowing nitrogen by heating to 482° C. at a rate of 2.8° C./minute and holding at this temperature for 3 hours. At the end of this period, the nitrogen was removed and replaced by flowing air at the same temperature for an additional 3 hours. Analysis of this material showed that it had an alpha activity of 52.

EXAMPLE 3

100 g (dry basis) of the SAPO-5 molecular sieve described in Example 1 was mixed with 54 g (dry basis) of pseudoboehmite (Versal 250 ™, LaRoche Chemical) and sufficient water to produce a mixture containing 52 wt % solids. This mixture was then mulled for 20 minutes in a Lancaster mixer and extruded to produce 1/16-inch cylinders. The extrudate was dried at 130° C. for eight hours.

The dried extrudate was then calcined in flowing nitrogen by heating to 482° C. at a rate of 2.8° C./minute and holding at this temperature for 3 hours. At the end of this period, the nitrogen was removed and replaced by flowing air at the same temperature for an additional 3 hours. Analysis of this material showed that it had an alpha activity of 83.

These examples demonstrate that the cracking activity (alpha) of a SAPO can be increased by contacting the as-synthesized SAPO with a gel alumina, e.g., pseudoboehmite, under moist conditions. These results further suggest that the acidity increases as a result of insertion of tetrahedral aluminum into the SAPO framework.

EXAMPLE 4

NMR analysis was used to confirm that the enhancement in acid activity was indeed the result of aluminum insertion into the SAPO-5 framework. Magic Angle Spinning (MAS) Si-NMR spectra of samples of materials from Examples 2 and 3 were obtained in a quantitative fashion by using 70 degree pulses at 200 second intervals with air as the drive gas. Spectra were obtained on a Chemagnetics CMX spectrometer operating at 360 MHz (proton frequency). The samples were spun at 4–4.5 kHz in zirconia rotors in an NMR probe which had been demonstrated to have no background signal from silicon. The chemical shifts were referenced to tetramethylsilane, the usual Si-NMR shift standard.

It is well-established that the next nearest neighbor tetrahedral atom substitution in both zeolites and SAPOs can be established by examination of the solid state magic angle spinning silicon NMR spectrum, MAS Si-nmr. See, e.g., G. Engelhardt and D. Michel, "High Resolution Solid State NMR of Silicates and Zeolites," John Wiley and Sons, New York, Chapters 3 and 5, (1987). For SAPOs, one generally finds that all of the next nearest neighbors are either silicon or aluminum so that the silicons are either $Si(OAl)_4$ or $Si(OSi)_4$ types. The consequence in the MAS Si-nmr is that one or two peaks for either or both of these types of silicon are seen. Acid cracking catalytic activity is associated only with the $Si(OAl)_4$ type of silicon, so it is reasonable to expect that synthesis or post-synthetic treatments which increase this type of silicon will also increase the size of the peak ascribed to the $Si(OAl)_4$ silicon.

For SAPO-5, as-synthesized and modified by our invention, the peaks for $Si(OAl)_4$ and $Si(OSi)_4$ are seen at 97.9 ppm and −109.9 ppm, in acceptable agreement with results in the literature when the width of the lines is taken into account. FIG. 1 shows the Si-nmr of the SAPO-5 before and after the activation treatment of the present invention and clearly demonstrates an increase in the size of the $Si(OAl)_4$ peak relative to the $Si(OSi)_4$ peak consistent with the increase in catalytic activity. These results further suggest that the acidity increases as a result of insertion of tetrahedral aluminum into the silicoaluminophosphate framework.

It is claimed:

1. A method of producing an improved catalyst, which method comprises contacting a crystalline silicoaluminophosphate molecular sieve having $Si(OSi)_4$ type silicon with gel alumina and water, and thereafter heating the resulting mixture to at least 425° C. to enhance the acid activity of the catalyst.

2. The method of claim 1 wherein the silicoaluminophosphate is selected from the group consisting of SAPO-4, SAPO-5, SAPO-11 SAPO-16, SAPO-17, SAPO-20, SAPO-31, SAPO-34, SAPO-35, SAPO-37, SAPO-40, SAPO-41, SAPO-42, and SAPO-44, MCM-2, MCM-3, MCM-4, MCM-5, MCM-6, MCM-7, MCM-8, MCM-9, and MCM-10.

3. The method of claim 1 wherein the gel alumina is selected from the group consisting of pseudoboehmite, boehmite, and diaspore.

4. The method of claim 1 wherein the mixture is formed by mulling the silicoaluminophosphate and the alumina together in the presence of water and forming catalyst particles by extruding the mulled wet mixture.

5. The method of claim 1 wherein the heating occurs in the presence of an inert gas and then in the presence of an oxidizing gas.

6. The method of claim 5 wherein the inert gas comprises nitrogen and said oxidizing gas comprises oxygen.

7. The method of claim 6 wherein the oxidizing gas is air.

8. The method of claim 1 wherein said heating in the presence of inert gas is carried out for 0.5 to 10 hours and said heating in the presence of oxidizing gas is carried out for 0.5 to 10 hours.

9. The method of claim 1 wherein said heating in the presence of inert gas is carried out for 1 to 5 hours and said heating in the presence of oxidizing gas is carried out for 1 to 5 hours.

10. The method of claim 1 wherein said crystalline silicoaluminophosphate is in its as-synthesized form when said contacting is initiated.

11. The method of claim 1 wherein said crystalline silicoaluminophosphate is in the ammonium-exchanged form when said contacting is initiated.

12. The method of claim 1 wherein said crystalline silicoaluminophosphate is in the hydrogen-exchanged form when said contacting is initiated.

13. The catalyst composition of enhanced activity prepared by the method of claim 1.

14. A method for enhancing catalytic cracking activity of a crystalline silicoaluminophosphate molecular sieve having $Si(OSi)_4$ type silicon which comprises compositing said silicoaluminophosphate with water and 10 to 90 weight percent of alumina based on the resulting composite, and exposing the resulting composite to elevated temperatures of at least 450° C. in the presence of nitrogen and then air, in order to substantially increase the catalytic activity of said mixture.

15. The method of claim 14 wherein the resulting composite is dried at a temperature of 50° to 150° C. for 0.05 to 2 hours, prior to said exposing to elevated temperatures.

16. The method of claim 14 wherein the resulting composite is dried at a temperature of 90° to 120° C. for 0.1 to 1 hour, prior to said exposing to elevated temperatures.

17. The method of claim 14 wherein said silicoaluminophosphate is selected from the group consisting of SAPO-4, SAPO-5, SAPO-11 SAPO-16, SAPO-17, SAPO-20, SAPO-31, SAPO-34, SAPO-35, SAPO-37, SAPO-40, SAPO-41, SAPO-42, SAPO-44, MCM-2, MCM-3, MCM-4, MCM-5, MCM-6, MCM-7, MCM-8, MCM-9, and MCM-10.

18. The method of claim 14 wherein said silicoaluminophosphate is SAPO-5.

19. A crystalline silicoaluminophosphate catalyst composite consisting essentially of a mixture of a crystalline silicoaluminophosphate having $Si(OSi)_4$ type silicon and about 10 to 90 weight percent of aluminum oxyhydroxide, said composite being treated by exposure to elevated temperatures of at least 450° C. in the presence of nitrogen and then air, in order to substantially increase the catalytic activity of said mixture.

* * * * *